United States Patent
Gelonese et al.

(10) Patent No.: US 10,349,149 B2
(45) Date of Patent: Jul. 9, 2019

(54) COMMUNICATIONS APPARATUS AND METHOD FOR STANDBY POWER CONTROLLER WHICH INTERRUPTS POWER TO AN APPLIANCE IN A STANDBY STATE

(71) Applicant: Embertec Pty Ltd, Dulwich, South Australia (AU)

(72) Inventors: Domenico Gelonese, Dulwich (AU); Riccardo Gatto, Dulwich (AU)

(73) Assignee: Embertec Pty Ltd (AU)

( * ) Notice: Subject to any disclaimer, the term of this patent is extended or adjusted under 35 U.S.C. 154(b) by 0 days.

(21) Appl. No.: 15/544,579

(22) PCT Filed: Jan. 19, 2016

(86) PCT No.: PCT/AU2016/000006
§ 371 (c)(1),
(2) Date: Jul. 19, 2017

(87) PCT Pub. No.: WO2016/115590
PCT Pub. Date: Jul. 28, 2016

(65) Prior Publication Data
US 2018/0020271 A1    Jan. 18, 2018

(30) Foreign Application Priority Data
Jan. 20, 2015  (AU) ................................ 2015900148

(51) Int. Cl.
*G08B 21/00*    (2006.01)
*H04Q 9/00*    (2006.01)
(Continued)

(52) U.S. Cl.
CPC .............. *H04Q 9/00* (2013.01); *G01D 4/006* (2013.01); *G06F 1/266* (2013.01);
(Continued)

(58) Field of Classification Search
CPC ............................ H04Q 2209/60; H04Q 9/00
(Continued)

(56) References Cited

U.S. PATENT DOCUMENTS 3,651,511 A * 3/1972 Andrews ............. H04L 12/1804
340/4.5
7,622,822 B2   11/2009 Gelonese
(Continued)

FOREIGN PATENT DOCUMENTS

AU       2011101402 A4     12/2011
AU       2012100197 A4      3/2012
(Continued)

OTHER PUBLICATIONS

UFO Power Center by Visible Energy, Inc., Introducing the UFO Power Center, How It Works, [retrieved from internet on Feb. 11, 2016] <URL: http://web.archive.org/web/20110521043213/http://www.energyinfo.com/howitworks.html>.
(Continued)

*Primary Examiner* — Mark S Rushing
(74) *Attorney, Agent, or Firm* — Craig A. Fieschko, Esq.; DeWitt LLP (57) ABSTRACT

A standby power controller having data communication capability. The standby power controller includes a data communication means adapted to communicate with a processing and display device. The processing and display device includes a processor and a display which are adapted to provide a user interface for the standby power controller.

9 Claims, 5 Drawing Sheets

(51) Int. Cl.
*G01D 4/00* (2006.01)
*G06F 1/26* (2006.01)

(52) U.S. Cl.
CPC ..... *H04Q 2209/40* (2013.01); *H04Q 2209/50* (2013.01); *H04Q 2209/60* (2013.01); *Y02B 90/243* (2013.01); *Y02B 90/245* (2013.01); *Y04S 20/325* (2013.01); *Y04S 20/40* (2013.01)

(58) Field of Classification Search
USPC .................................................. 340/870.07
See application file for complete search history.

(56) References Cited

U.S. PATENT DOCUMENTS

| | | |
|---|---|---|
| 8,190,940 B2 | 5/2012 | Gelonese |
| 8,301,914 B2 | 10/2012 | Gelonese |
| D700,579 S | 3/2014 | Mobbs |
| 8,872,390 B2 | 10/2014 | Buchheim et al. |
| 8,963,086 B2 | 2/2015 | Gelonese et al. |
| D726,107 S | 4/2015 | Mudge et al. |
| 9,106,099 B2 | 8/2015 | Gelonese |
| D753,063 S | 4/2016 | Gelonese et al. |
| 9,703,349 B2 | 7/2017 | Gelonese |
| 2006/0155395 A1* | 7/2006 | Lim ..................... G05B 19/042 700/22 |
| 2008/0106148 A1 | 5/2008 | Gelonese |
| 2009/0235107 A1 | 9/2009 | Gelonese |
| 2010/0194358 A1* | 8/2010 | Stanford-Clark ....... H02J 9/005 323/234 |
| 2010/0231043 A1* | 9/2010 | Hu ........................ G06F 1/266 307/39 |
| 2011/0083028 A1* | 4/2011 | Jung ...................... H02J 9/005 713/323 |
| 2011/0266870 A1* | 11/2011 | Hu ........................ G06F 1/266 307/39 |
| 2011/0282509 A1* | 11/2011 | Yegin .................... G06F 1/266 700/295 |
| 2012/0080949 A1 | 4/2012 | Gelonese |
| 2013/0285837 A1* | 10/2013 | Uchida ............... H04L 12/2825 340/870.02 |
| 2014/0117780 A1 | 5/2014 | Buchheim et al. |
| 2014/0285019 A1 | 9/2014 | Gelonese |
| 2014/0292289 A1 | 10/2014 | Gelonese |
| 2014/0310744 A1 | 10/2014 | Gelonese |
| 2014/0320314 A1* | 10/2014 | Gagnon ................. G01D 4/008 340/870.39 |
| 2014/0358311 A1* | 12/2014 | Lai ........................ G01D 4/002 700/295 |
| 2015/0039429 A1 | 2/2015 | Gelonese |
| 2015/0137621 A1* | 5/2015 | Emby ................... G05B 11/01 307/140 |
| 2015/0256032 A1 | 9/2015 | Gatto |
| 2015/0338238 A1 | 11/2015 | Gelonese |
| 2015/0349532 A1 | 12/2015 | Gelonese |
| 2016/0062440 A1 | 3/2016 | Gelonese |
| 2016/0099571 A1 | 4/2016 | Gelonese |
| 2016/0215960 A1 | 7/2016 | Gelonese |
| 2016/0223601 A1 | 8/2016 | Gelonese |
| 2016/0370834 A1 | 12/2016 | Gelonese |
| 2016/0370836 A1 | 12/2016 | Gelonese |
| 2017/0013227 A1 | 1/2017 | Gelonese |
| 2017/0131332 A1 | 5/2017 | Gelonese |

FOREIGN PATENT DOCUMENTS

| | | |
|---|---|---|
| AU | 2016204730 A1 | 7/2016 |
| WO | WO 2016/040980 A1 | 3/2016 |
| WO | WO 2016/081982 A1 | 6/2016 |
| WO | WO 2016/115589 A1 | 7/2016 |
| WO | WO 2016/115590 A1 | 7/2016 |
| WO | WO 2016/119008 A1 | 8/2016 |
| WO | WO 2016/138551 A1 | 9/2016 |
| WO | WO 2016/141412 A1 | 9/2016 |

OTHER PUBLICATIONS

International Search Report, PCT/AU2016/000006, dated Feb. 19, 2016.

* cited by examiner

COMMUNICATIONS APPARATUS AND METHOD FOR STANDBY POWER CONTROLLER WHICH INTERRUPTS POWER TO AN APPLIANCE IN A STANDBY STATE

TECHNICAL FIELD

This invention relates to a standby power controller having data communication capability.

BACKGROUND OF THE INVENTION

The following references to and descriptions of prior proposals or products are not intended to be and are not to be construed as statements or admissions of common general knowledge in the art. In particular, the following prior art discussion does not relate to what is commonly or well known by the person skilled in the art, but may assist in the understanding of the inventive step of the present invention, of which the identification of pertinent prior proposals is but one part.

There is currently world-wide concern about the level of use of electrical energy for both domestic and commercial uses. In part this concern is based on the greenhouse gas production associated with the generation of electrical energy, and the contribution of that greenhouse gas to anthropogenic global warming. There is also a concern for the capital cost involved in building the electricity generating plants and electricity distribution networks required to generate and distribute an increasing amount of electricity.

A significant contributor to the energy use of households is the audio visual equipment including multiple devices such as televisions, television decoders, television recorders and sound equipment now found in virtually all homes.

Efforts have been made to reduce or control the use of energy by television receivers and associated audio visual equipment, in particular with the use of standby power controllers, and these have met with considerable success. Attempts have been made to add improved functionality to the basic standby power controller to improve power saving and also to enhance user experience. User experience is important. One of the greatest barriers to power saving by standby power controllers is user uptake and continued use. Features which address these problems often require user interaction or more sophisticated controls.

DISCLOSURE OF THE INVENTION

Accordingly, in a first aspect this invention provides a standby power controller including data communication means adapted to communicate with processing and display device, the processing and display device providing a user interface.

In a further aspect, the invention may be said to lie in standby power controller including a data communication means adapted to communicate with a processing and display device, the processing and display device including a processor and a display which are adapted to provide a user interface for the standby power controller.

In preference, the processing and display device is a mobile computing device.

In preference, the mobile computing device is a smartphone.

In preference, the data communications means includes a short range wireless transceiver.

In preference, the short range wireless transceiver is a Bluetooth transceiver or a wi-fi transceiver.

In preference, the standby power controller transmits to the processing and display device usage data describing the functioning of the standby power controller.

In preference, the usage data includes the power being drawn through the standby power controller.

In preference, the usage data includes the status of the supply of power through the standby power controller.

In preference, at least some functionality of the standby power controller is controlled at least in part by commands received from the user interface.

In preference, the functionality controlled in part by commands from the user interface includes the switching of power to an appliance by the standby power controller.

In a yet further form the invention may be said to lie in a mobile computing device when programmed to provide a user interface for a standby power controller.

In preference, the user interface allows a user to control the period of time which the standby power controller will permit to elapse between detections of user interaction before removing power from controlled outlets.

In preference, the user interactions detected are use of a remote control device to control a television, said television receiving power through the standby power controller.

In preference, the user interface allows a user to configure a warning device by which the standby power controller warns a user of impending withdrawal of power from a controlled outlet.

In preference, the warning device is a flashing light, the brightness of which is configured by the user interface.

In preference, the time period for which the warning device is active before withdrawal of power is configured by the user interface.

In preference, the mobile computing device receives from the standby power controller data describing the power drawn by at least one appliance provided with electrical power by the standby power controller, the mobile computing device processing said data and displaying information concerning the power use of the appliance to a user.

In another aspect, the invention may be said to lie in a method for providing a user interface for a standby power controller including providing a processing and display unit; establishing a data link between the standby power controller and the processing and display unit; receiving data describing the power drawn by at least one appliance having electrical power provided by the standby power controller; the processing and display unit processing receiving said data and displaying information concerning the power use of the appliance to a user.

In preference, the method includes establishing a data link to an external entity; transmitting usage data to said entity; and receiving from said entity information concerning energy usage.

BRIEF DESCRIPTION OF THE DRAWINGS

The invention will now be described with reference to certain non-limiting embodiments in connection with the accompanying drawings in which.

DETAILED DESCRIPTION OF THE DRAWINGS

Figure 1:
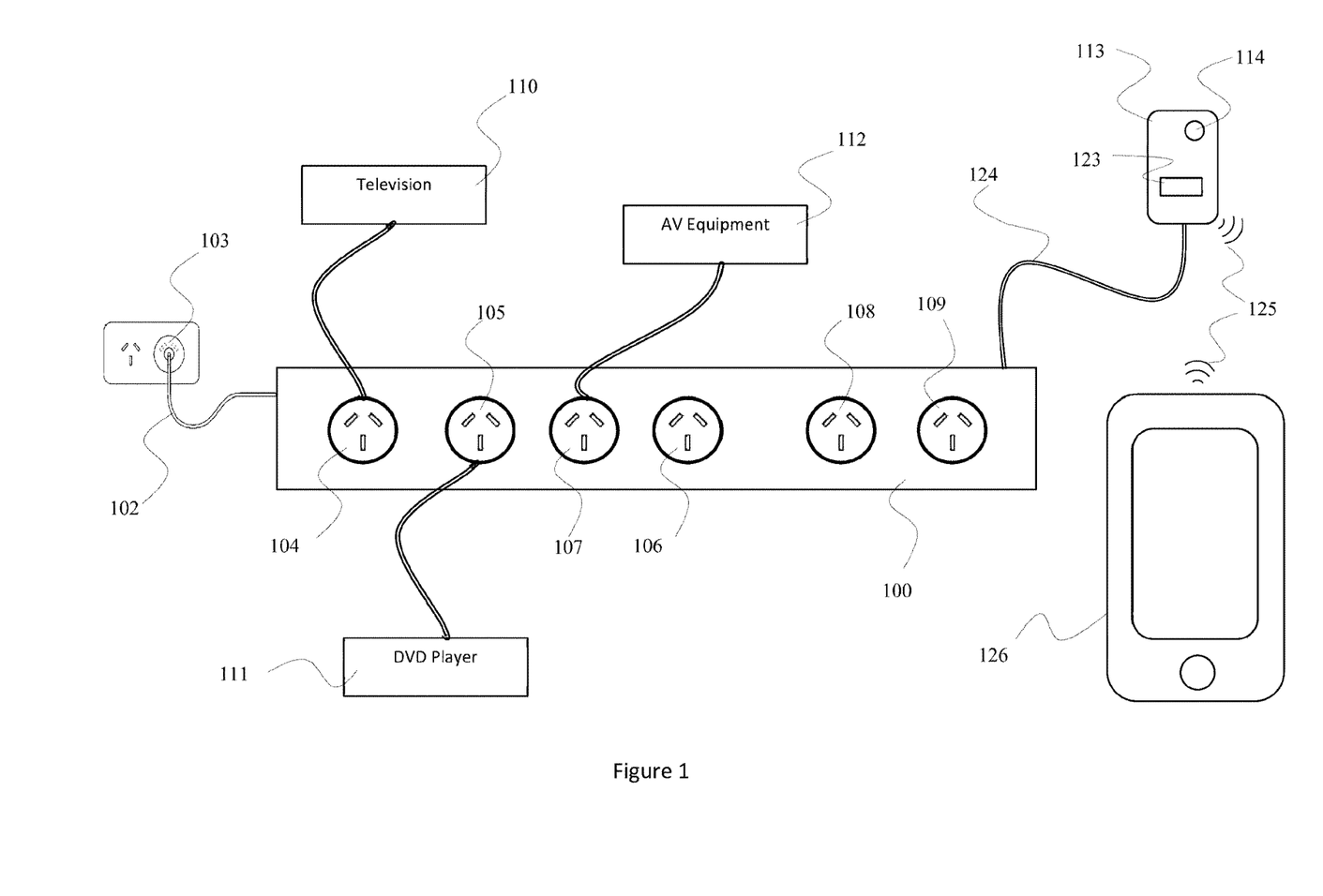
FIG. 1 is a representation of a standby power controller incorporating the invention.

Referring first to FIG. 1, it is to be understood that this is a general representation of an installation including a standby power controller (SPC) including the invention and is illustrative only. It is not intended to limit the number or configuration of continually powered or switched or monitored main outlets, or of communication interfaces or other functional modules.

FIG. 1 shows a representation of an SPC including an embodiment of the current invention. An SPC is a device which controls the flow of electrical power to one or more connected appliances such that when one or more, or a particular one, of the connected appliances is in a "standby" state where it is not being used, the electrical power supply to one, all or selected ones of the connected appliances is interrupted.

The SPC 100 receives electrical power from a General Purpose Outlet 103, via power cord 102.

The SPC includes Monitored and Controlled Outlets 104,105,106, 107. The SPC also includes Uncontrolled Outlets 108, 109. In general, any number of Monitored and Controlled outlets and Uncontrolled Outlets may be provided. In an embodiment, the Uncontrolled outlet may be absent.

Monitored and Controlled Outlet 104 supplies electrical power to a television 110. Further Monitored and Controlled Outlets 105, 106 may provide electrical power to other appliances including other audio-visual equipment, for example a DVD player 111 and audio equipment 112. In an embodiment having only one Monitored and Controlled outlet, multiple devices may be powered from the one outlet using a powerstrip. In any embodiment, multiple devices may be powered from one Monitored and Controlled outlet using a powerstrip.

The SPC includes a Sensing and Communications Unit 113. In a preferred embodiment, this unit is in data communication with the body of the SPC via cable 124, which may also provide power to the Sensing and Communications Unit 113. The Sensing and Communications Unit 113 also includes a remote communication means, in the illustrated embodiment a Bluetooth transceiver 123. The cable 124 may be a fixed connection or may be plug connected at one or both ends. In a further embodiment, the Sensing and Communications Unit may be integrated with the SPC body. In further embodiments, the remote communication means may be provided by any convenient wireless protocol, including without limitation, wifi, zigbee and RF4CE.

Modern television sets and other appliances including audio visual equipment, when turned "off" by the remote control, enter a low power "standby" state, in which energy is still consumed, although at a significantly lower level that when the device is nominally "on". When the television is in this standby state it is not in use, and the power supply to it may be cut to save energy.

It is also the case that television sets may be left on for extended periods when no user is viewing the screen. This may happen when a user falls asleep in front of the television, or when a user, particularly a child or a teenager, simply leaves the vicinity of the television without turning the television off. This state may be termed "Active Standby". In this state the television is not in use, and the power supply to it may be cut to save energy.

The SPC may detect that the television has entered a standby state by any convenient means or combination of means.

In order to save energy the SPC operates to remove the power supply from Monitored and Controlled outlet 104 and hence from the attached television, whenever the television is detected to not be in use. In general this operation to remove the supply of power will be by operation of a switch or relay in or associated with the SPC, but any suitable means may be used.

The SPC may also include a power sensor adapted to sense the power drawn through a Monitored and Controlled outlet. The power sensor detects characteristics of the power flow through the outlet. When the characteristic is such as to indicate that the television is in a standby mode the power to the Monitored and Controlled outlet 104, and hence to the attached television or monitor is interrupted.

The SPC may include any number of Monitored and Controlled outlets, which may be monitored and controlled individually or together.

The SPC may include means to detect that a user is interacting with the audio visual equipment and/or the television. The sensing and communications unit 113 includes an infra-red sensor 114. This sensor 114 receives IR signals from a remote control associated with the television or other connected AV equipment or appliances.

It is likely that a user, when actively watching television, will periodically use the remote control to change channels, adjust volume, mute commercials, etc. Thus a remote control signal receiver, such as IR sensor 114 can be used as a usage sensor. If no remote control activity is detected by the IR sensor 114 for a period of time, the assumption may be made that the television is not in use, and the power supply to the Monitored and Controlled outlet 104, and hence to the television, is interrupted. This may be achieved by using a countdown timer which starts from a specific initial value equal to a particular time period, the Initial Countdown Period, say one hour, and having this countdown time continuously decrement. Each detected use of the remote control will reset the countdown timer to the initial value. When the countdown time reaches zero, there has been no remote control activity for the time period, and the television is assumed to not be in active use and the electricity supply to the Monitored and Controlled outlet 104, and hence to the television, is interrupted.

It may be sufficient to determine that a user is present in the vicinity of the television in order to decide that the television should not be turned off. Any suitable sensor may be used for determining that a user is present and thus that power to the television should not be interrupted. These include, without limitation, passive IR sensors, ultrasonic sensors, cameras, any other passive or active movement sensors, and sound detectors.

Whatever means is used to determine that the television is on, but not in use, it is unlikely to be completely free of false positives, that is, determining that the television is in Active Standby and not in use when the television is in fact in use. If the television is turned off when a user is still watching a program, the user will be irritated. Repeated occurrences are likely to lead to the power control function of the SPC being bypassed, preventing power savings.

The SPC may include a warning LED. When the SPC determines that the television is in Active Standby, the warning LED will flash to alert any user to the imminent shutdown of the power to the television. In the case where there is a false positive, that is, there is a user watching the television, the user may react to observing the flashing of the warning LED by pressing a key on the remote control. The IR signal from the remote control is detected by the IR sensor 114, and the countdown timer is reset, preventing the power to the television being interrupted.

Other methods for warning of imminent shutdown of power to the television may be used. An audible warning tone may sound.

The SPC may include software allowing control of the warning mechanism. The brightness of the LED may be variable. It may be possible to set times when the warning should take certain forms. For example, an audible warning may be used at certain times of the day, whilst the LED is used at other times. At still further times, no warning at all may be given.

Uncontrolled power outlets 108, 109 are optionally provided to allow for power to be supplied to devices which should not have the power supply cut when the television is not in use. This outlet supplies power at all times when the SPC is plugged in. Any number of uncontrolled outlets may be provided.

Devices other than a television may be connected along with a television to the Monitored and Controlled outlets. In this case, the total load of all devices will be monitored for the characteristics indicating that all devices so connected are in a standby or unused state.

A third type of power outlet (not shown) may be provided. This non-monitored, controlled outlet is not monitored by the power sensor, so the power drawn by any load connected to the outlet does not contribute to the determination that the monitored load is in a standby or unused state. This outlet is controlled. When power is interrupted to the monitored, controlled outlet 108, power is also interrupted to this outlet.

The remote communication means provides a data link to processing devices external to the SPC. An external device may provide a user interface for the SPC, enabling a user to monitor and/or control some functions of the SPC.

There is provided Bluetooth transceiver 123 which provides data link 125 to an external processing and display device, in the illustrated embodiment, a smartphone 126. In other embodiments, without limitation, the processing and display device may be a tablet computer or a desktop computer.

The SPC uses data link 125 to transmit usage data describing the functioning of the SPC to the smartphone 126. The user interface receives and processes this data for display to a user.

The smartphone 126 runs a program which provides a user interface for the SPC. This user interface allows a user to control settings of the SPC. Settings may include the countdown time before power is removed when no IR activity is detected. The user interface may also be used to activate and deactivate the power saving functions of the SPC.

The usage data includes the level of power being drawn through the SPC by the connected appliances. It may also include the status of the power supply to the appliances, such as the ON/OFF status of any switch or rely of the SPC.

The SPC is able to receive commands from the user interface to control any user controllable functions of the SPC. The SPC may be able to receive and respond to commands to turn the supply of power on or off to the connected appliances. The SPC is able to receive and act upon commands to change user configurable settings of the SPC which may also be configured via the user interface.

The smartphone 126 will in general have a capability to connect to the internet. The user interface program is able to use this internet connection to send data describing the function of the SPC to an external entity. The external entity may be an energy retailer, or other energy market participant. The external entity may be a funding entity, an entity which has at least partly funded the installation of the SPC in the household. A funding entity will have an interest in the continuing operation of the SPC and the energy savings which may be attributed to the SPC.

Figure 2:
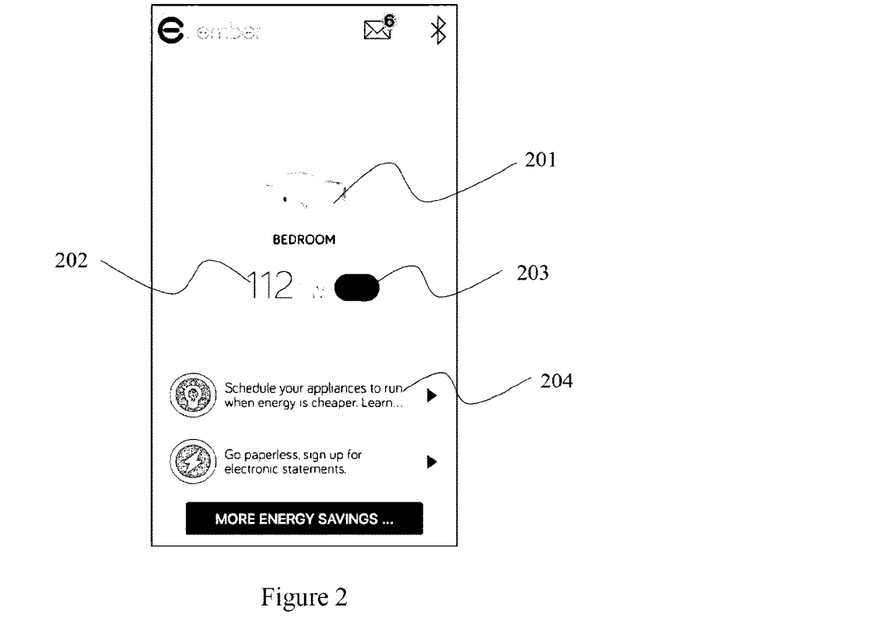
FIG. 2 is a screen of a user interface for an SPC.

FIG. 2 shows a screen of the user interface for the SPC. This user interface is provided by an App which runs on a householder's smartphone. In other embodiments, the App may run on any mobile computing device, including without limitation, tablet computers. The user interface may also be provided by a program running on any computing device, or by a dedicated processing and display device.

There is an equipment icon 201 which serves to indicate which SPC device is being monitored. Although a single equipment icon is shown, the user interface may be able to handle more than one SPC. Each device being monitored will have an equipment icon on this screen. The label, in this case "Bedroom", is user defined.

The screen includes an energy usage display 202, in the illustrated embodiment showing that the SPC labelled "Bedroom" is supplying a load of 112.8 watts.

The illustrated user interface is able to directly control switching of the SPC. In the illustrated embodiment, the SPC has a single power control relay which a user can switch on and off directly by moving the switch 203. In response to the moving of the switch 203, the user interface sends a command, via the data link 125, to the SPC, to command that the relay in the SPC be turned on or off.

The user interface is able to display messages 204 received from an external entity via the smartphone's internet connection. These messages may be, for example, tips concerning energy saving from the household's energy retailer. The messages may be customised, taking in to account the data describing the usage of the SPC which has been transmitted to the external entity.

Figure 3:
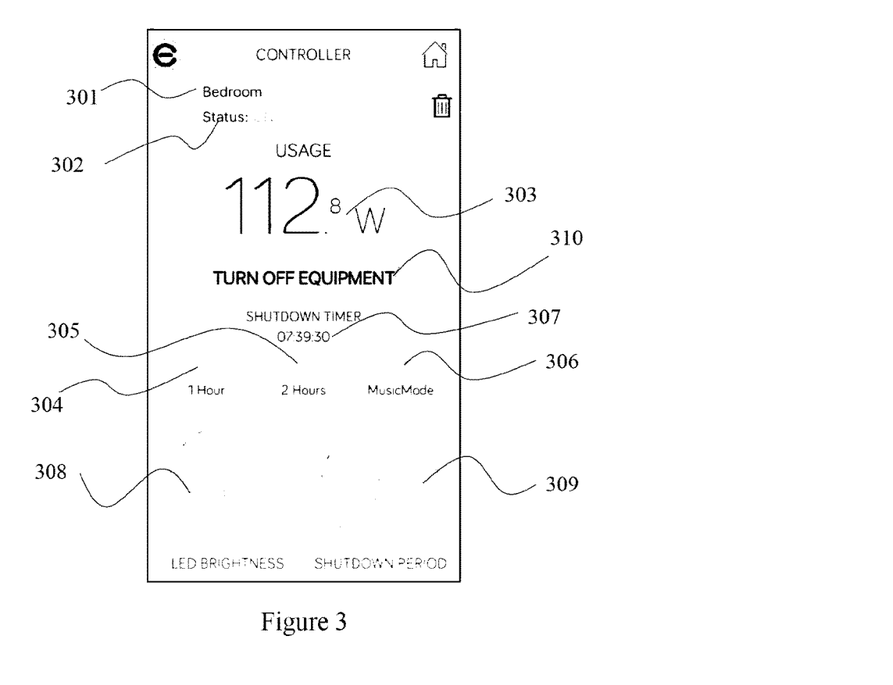
FIG. 3 is a further screen of a user interface for an SPC.

FIG. 3 shows a further screen from the user interface provided by the smartphone. There is a mini equipment icon and label 301, which indicates which SPC device is being monitored by the user interface.

There is a status indicator 302 which displays the status of the supply of power to the appliances connected to the SPC, in the illustrated embodiment, the ON/OFF status of the relay of the SPC.

A significant part of the function of the user interface is to display the energy usage of the appliances drawing power through the SPC. The main energy usage display 303, shows that the SPC is supplying 112.8 watts.

The user interface allows a user to configure the Initial Countdown Period to accord with the household's television watching habits, or a specific television watching requirement. Where a household is likely to leave the remote control of the television unused for relatively long periods, while still actively watching the television, a longer Initial Countdown Period may be chosen. This means that in cases where the television is not in active use, a longer period will elapse before energy saving action is taken by the SPC, wasting energy. However this must be balanced by the fewer false positives, turning the television off when it is being actively watched. Excessive false positives may lead to frustration and deinstallation of the SPC.

There is provided a radio button 304 which when active sets the Initial Countdown Period of the SPC to one hour.

There is provided an alternative radio button 305 which when active sets the Initial Countdown Period of the SPC to two hours. The radio button 306, labelled MusicMode, sets the Initial Countdown Timer to a much longer time period, in the illustrated embodiment eight hours, in order for the appliances to be used for, for example, playing music for a party.

During operation of the SPC, a shutdown timer counts down from the Initial Countdown Period, to zero. The shutdown timer is rest to the Initial Countdown Period every time user interaction is detected. The value of the shutdown timer is communicated to the user interface by the SPC and is displayed 307 by the user interface. In the illustrated embodiment, it can be seen that, in accordance with the setting of radio button 306, the Initial Countdown Period has been set to eight hours, and seven hours, thirty-nine minutes and thirty seconds remain before the SPC will remove power from the controlled outlets if no user interaction, in the form of use of an IR remote control, is detected.

The SPC includes a warning device to warn that the SPC is about to remove power from appliances it has determined to no longer be in active use. In the illustrated embodiment the warning device is a flashing LED. The SPC may be used in a variety of contexts within the home, which may require different levels of brightness of the LED in order for it to be an effective warning. The LED should be bright to attract attention in a brightly lit living room. Conversely, in a darkened bedroom, where a user may have fallen asleep, a bright LED may be overly intrusive.

There is provided a first knob control 308, which allows the brightness of the LED warning light on the SPC to be adjusted by turning the control. The control setting of the knob control 308 displayed by the user interface is transmitted via the data link 125 to the SPC as a command to set a brightness level.

The warning LED of the SPC will flash for a period to indicate that shutdown of power to the television is imminent. This period may be adjusted in order to suit the context in which the SPC is used. For example, in a busy lounge room, a period as long as ten minutes may be appropriate in order to ensure that a user's attention is gained if a user is present. In a darkened bedroom where the use may have fallen asleep, a long flashing period may be overly intrusive.

There is provided a second knob control 309, which permits a user to configure the length of time for which the warning LED of the SPC will flash after a determination has been made that the television is not in use, before power is withdrawn from the television.

The illustrated user interface is able to directly control switching of the SPC. Touch control 310 is provided to allow a user to switch the power control switch of the SPC directly. The control 310 shows "TURN OFF EQUIPMENT" because power is currently being supplied to the equipment connected to the SPC. Using the control will command the switch of the SPC to switch off. Were the switch on the SPC to be off, the control would display "TURN ON EQUIPMENT" and using the control would command the SPC to switch the switch of the SPC to on.

Figure 4:
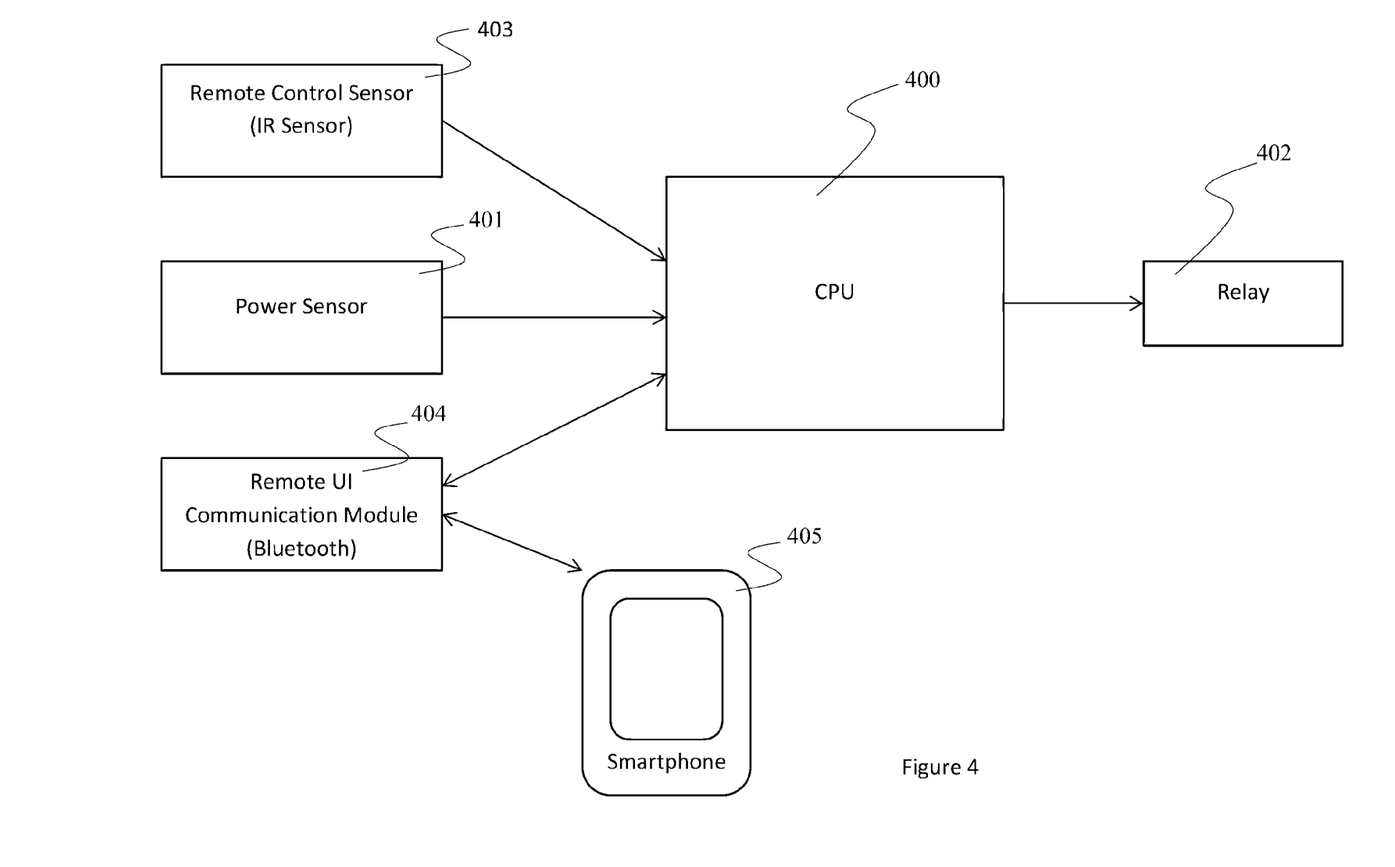
FIG. 4 is a functional block diagram of the operation of a standby power controller incorporating the invention.

A block diagram of the functions of an embodiment of an SPC is shown in FIG. 4. In use the SPC operates to provide power to a television. A CPU 400 is provided which executes commands to provide the analytical functionality of the SPC.

There is a power sensor 401 which monitors the power drawn by the television. The power sensor may monitor the current drawn through the SPC by the television, or both current and voltage may be monitored. Phase angle may also be monitored. The output of the power sensor is provided to the CPU 400.

The monitored power draw is used by the CPU to determine the power state of the television. In an embodiment, a significant drop in the magnitude of the power draw is used to determine that a low power standby mode has been entered. Threshold values of power consumption may be used to determine the power state of the television, with any value below a threshold being determined to indicate that the television is in a standby power state. Other characteristics of the power use may be used to determine that the television is not in use. This may be the presence, absence or a defined pattern of small fluctuations of the power draw.

The CPU controls one or more relays 402. When a determination is made that the television is in a standby state, the CPU controls the relay 402 in order to withdraw power from the television and, optionally, associated equipment.

There is provided a Remote Control Use sensor 403. In a preferred embodiment this is an infra-red (IR) sensor which detects use of infra-red remote control devices.

The CPU receives data from the IR Sensor indicating use of any IR remote control.

The CPU determines when no IR activity has been detected for a predetermined period. When this occurs, the CPU flashes the warning LED or provides another warning that the television is about to be shut down. If no IR activity is detected in response to the warning, the power to the television is interrupted.

While power to the television is interrupted, the IR sensor sensor continues to monitor IR activity, and send the results to the CPU. When the CPU determines that IR activity has been detected, the relay 402 is operated and thus power is restored to the television.

In a preferred embodiment, when the power to the television is in the interrupted state, the SPC will return power to the television when any IR activity is detected. In an alternative embodiment, the SPC may require that the received IR signal is identified as an "ON" command for the television before returning power to the television. This reduces "false positives" where the SPC reacts to an IR source which is other than the user attempting to turn the television on.

The CPU may be programmed to keep track of the power consumption of the monitored load, both when the load is using full power and when it is in a low power standby state. Information concerning the number of times the power to the load is interrupted may be recorded. Whether the power was interrupted because the television was in a low power standby mode, or because the television was determined to not be in use may also be recorded. This data may be used to calculate or estimate the energy savings achieved by the SPC.

The SPC includes a Remote User Interface Communication Module 404. In a preferred embodiment, this is a Bluetooth communication module. The Bluetooth communication module 404 is in data communication with a Remote User Interface Display 405. This is a processing and display device, capable of running a user interface program which is adapted to display and operate a user interface for the SPC. In a preferred embodiment, this is a smartphone. Alternatively, without limitation, the processing and display device may be a tablet computer, a laptop computer or a desktop computer. A dedicated display device may also be provided.

The SPC may communicate the energy savings calculated or estimated to the smartphone for display on the user interface. Alternatively, the SPC may communicate the raw data from the power sensor and the IR sensor, along with the timing of the relay control activity, to the smartphone. The user interface program may then use this data to calculate energy savings for display to a user. The user interface program may process the data for display to the user in any convenient manner. Complete information concerning the operation of the SPC may be communicated to the smartphone for storage and analysis. This data and the results of analysis may be communicated by the smartphone, to third parties.

The user interface may be used to control the SPC. The value of the predetermined period which must elapse before the SPC concludes that the television is not in use may be changed temporarily or permanently. That is, the threshold time of no detection of IR signals before the SPC decides that the television is in Active Standby may be varied from the user interface.

A major cause of failure by SPCs to save power is de-installation when a user finds the action of the SPC intrusive or annoying and simply removes the SPC, preventing any energy saving. False detection of Active Standby and subsequent cutting of power to the television which is in use is a major cause of this failure.

The user interface may use an internet connection provided by the smartphone to create a data link to an external entity. This external entity may be or may have association with, the manufacturer of the SPC. The SPC may report to the user interface program, the frequency of use of the IR remote control. The user interface program may also collect information on how often and at what times the user uses the remote control to prevent the SPC removing power from the television after a warning has been given. These are occasions when the SPC has determined incorrectly that the television is in Active Standby when a user is still actively watching the television. This information may be passed to the external entity and hence to the SPC manufacturer. The data may used to determine a more accurate pattern which indicates that the television is in fact in Active Standby, allowing less occasions where the SPC attempts to or does cut power to a television in active use. Improvements in the determination of Active Standby reduce de-installation.

The user interface may present information about the use of IR and correct and incorrect determination of Active Standby, and may also pass this information to the external entity. Where this information shows that incorrect determinations are rare, user satisfaction with the SPC is likely to be improved, leading to lower de-installation rates.

Where threshold values of power consumption are used, these may be changed by a user from the user interface on the smartphone.

In an embodiment where the warning mechanism is controllable, the user interface on the smartphone may allow control of, without limitation, the brightness of a warning LED, the volume of an audible warning, the times when the flashing LED, the audible warning, and no warning should be used.

The user interface allows information collected by the SPC to be displayed to a user. The power being drawn through the SPC by the connected load may be displayed to a user. In an embodiment where the SPC monitors the voltage and/or frequency of the incoming electricity supply, this information may be displayed to a user. Any parameters of the incoming electricity supply monitored by the SPC may be reported to the user interface program. These may be compared with pre-set values, for example, the limits set for these parameters by a regulator, to report on the performance and quality of the incoming electricity supply.

The user interface may allow the user to control the relay in the SPC directly, turning the switched outlets on and off independently of the determined power and usage state of the television.

Figure 5:
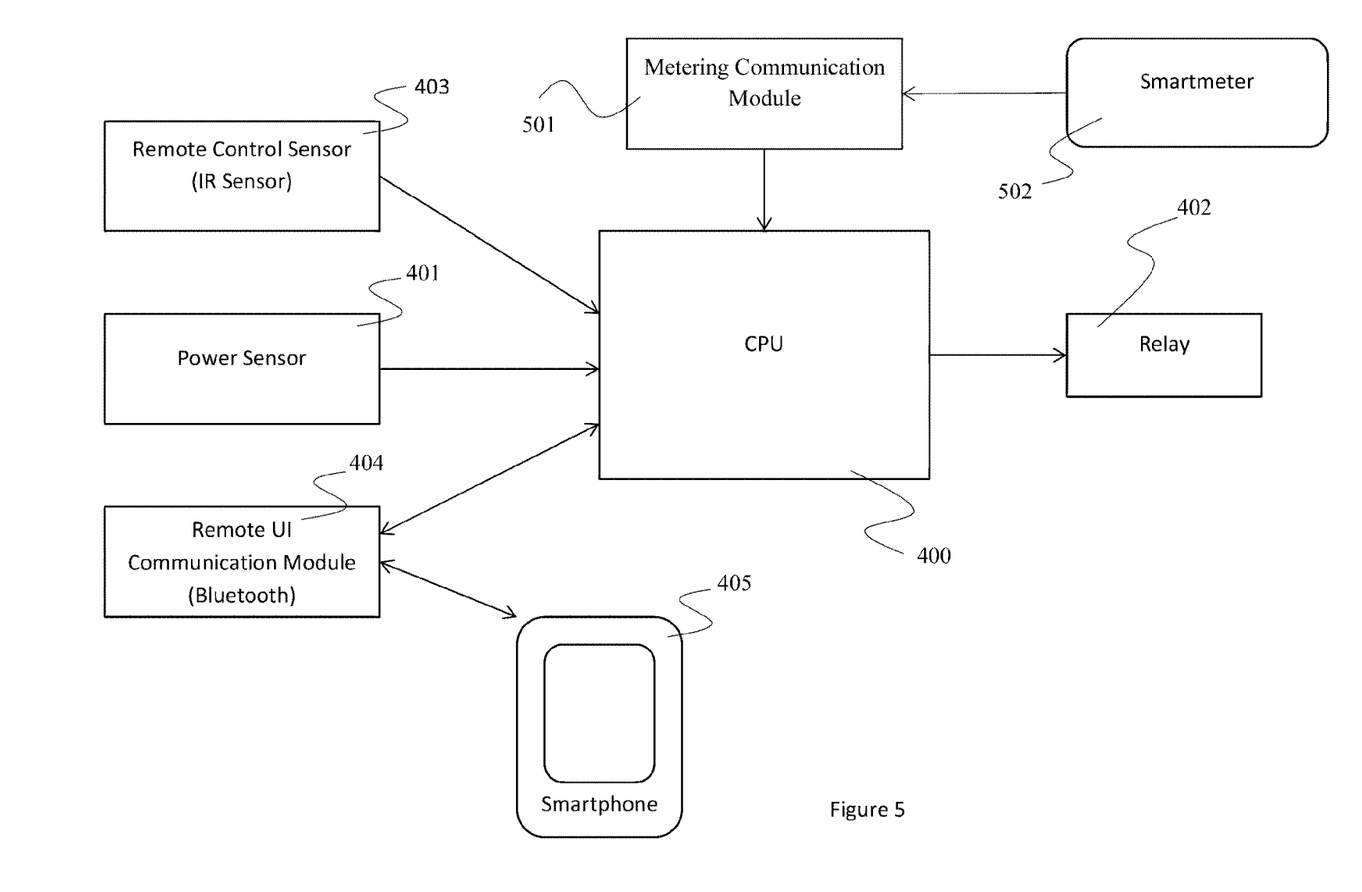
FIG. 5 is a block diagram of the hardware of an embodiment of the invention.

In an embodiment, illustrated in FIG. 5, the SPC includes the functionality of an In Home Display (IHD). At its simplest, an IHD displays the current usage of electrical energy by a household to the householder. The SPC includes a Metering Communication Module 501, which receives metering data from an external metering device. In a preferred embodiment the external metering device may be a Smartmeter 502, which is a device installed by the supplier of electricity to the premises to collect metering data for communication to the electricity supplier for billing purposes, which may also have the capability to communicate the data to a householder. The Metering Communications Module 501 is a ZigBee communications module, paired with the Smartmeter 502.

Alternatively, the external metering device may be a device installed independently of the electricity supplier which monitors the electricity supplied to the household. Such a device may include current clamps placed around the main incoming electricity conductors of the premises to measure current flow to the premises.

Commonly, an IHD will also display the cost of this usage. This information may be used by the householder to modify their electricity usage to minimize costs.

The display of the IHD is provided by the smartphone 405. The information to be displayed is passed from the CPU 400 to the smartphone via the Bluetooth module 404.

The IHD function may be split between the SPC and the smartphone in any convenient manner. In an embodiment, the CPU may perform all of the calculations required for the IHD functionality and communicate screens for display by the smartphone. In a further embodiment, the SPC may accumulate the raw data from the Smartmeter, periodically passing the data to the smartphone, via the Bluetooth link, when the smartphone is within range. The user interface program on the smartphone would then perform all the calculations and data formatting required to perform the IHD function, and display the results on the smartphone display. Further embodiments may divide the features between the SPC and the smartphone in other ways.

Figure 6:
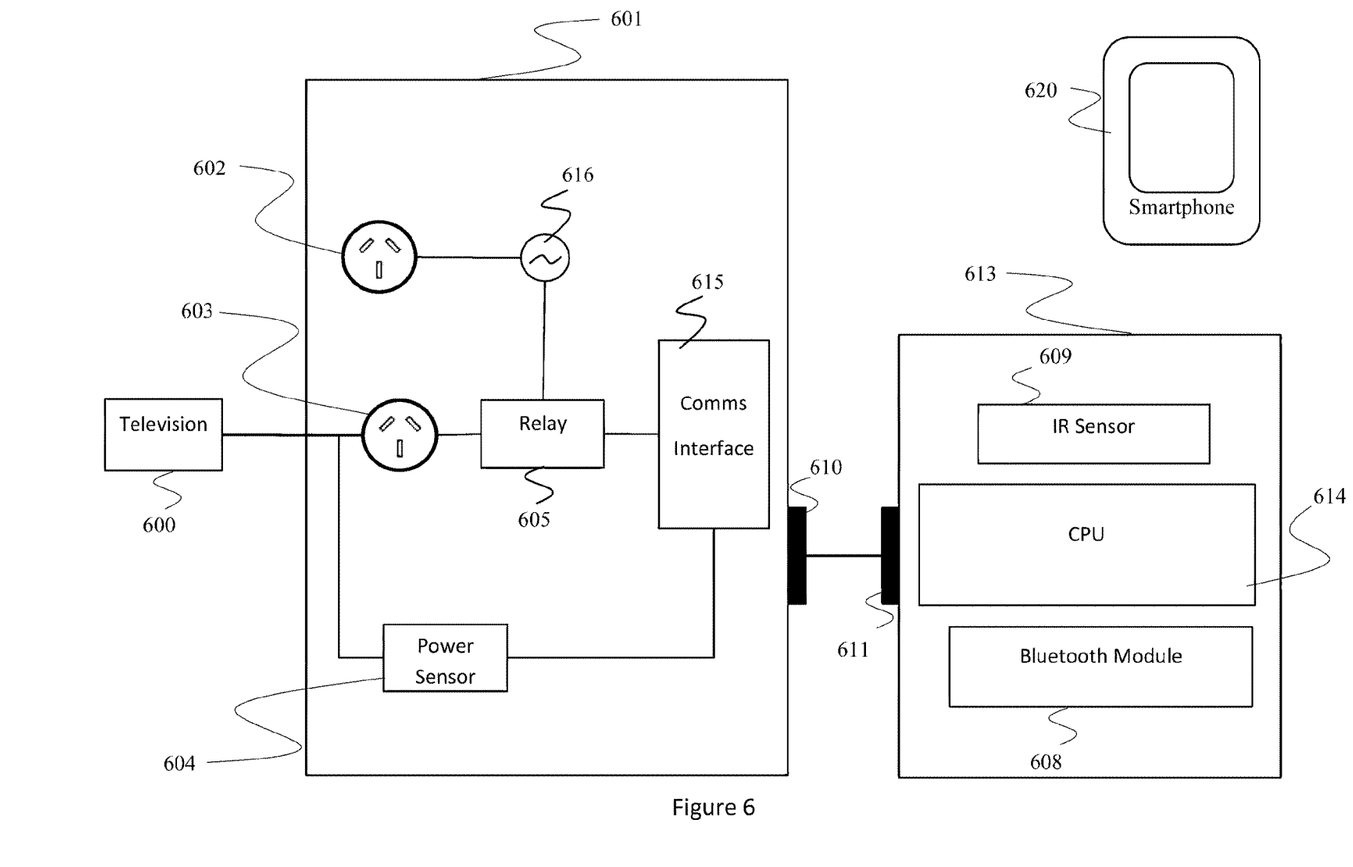
FIG. 6 is a block diagram of the hardware a further embodiment of the invention.

Referring now to FIG. 6, there is shown a block diagram representation of an SPC incorporating the invention.

There is an SPC base 601 which supplies power to a television 600 and optionally other audio visual equipment.

There is provided a Sensor Unit 613, which houses sensors and a CPU 614 which provides all the calculation and analytical functionality of the SPC.

The Sensor unit includes plug connector 611. The SPC base includes plug connector 610. In the illustrated embodiment, these connectors are USB connectors. The SPC base unit and the Sensor Unit are connected by a USB link between these connectors. Any plug connected wired communications protocol may be used. In an alternative embodiment, a standard RS-232 connector is employed. An advantage of a wired connection is that power can be supplied from the SPC base to the Sensor Unit over such a connection. In this case the sensor unit does not need battery or other independent power supply. In a further embodiment, the Sensor Unit may have an independent power supply, and the data connection may be provided by a wireless protocol.

The SPC base 601 includes a connection to external electricity supply 616. Electricity is supplied directly to always on electricity outlet 602. Electricity is provided via relay 605 to switched and monitored outlet 603. The power drawn through switched and monitored outlet 603 is monitored by power sensor 604. Electricity is provided to television 600 by switched and monitored outlet 603.

Communications Interface 615 provides data communication with CPU 614 located in the Sensor Unit.

The Sensor Unit 613 include Bluetooth Module 608. This provides data communication for CPU 614 to a Smartphone 620. The smartphone runs programs which provide a user interface for the SPC. Any other suitable display and processing device, including without limitation a tablet computer and a desktop computer may be used to provide the user interface.

In use, the IR Sensor provides data to the CPU concerning use of an IR remote control to control the television. The power sensor provides data about the power state of the television to the CPU. As described in the description of FIG. 1, the CPU uses this data to determine when the television has entered a low power standby mode, or is in Active Standby, that is, on but not being actively watched by a user. In either case, the CPU controls relay 605 to remove the electricity supply from the television, saving energy.

When the IR Sensor detects IR indicating that the television is to be turned on, CPU controls the relay to return electricity supply to the television.

Any number, including zero, always on outlets 602 may be provided. One or more switched and monitored outlets 603 may be provided.

The Bluetooth module allows all data collected by the CPU to be communicated to user interface program running on smartphone 620. The operation of the SPC including calculations of energy saved may be communicated to a user. The user interface provided by the smartphone via the Bluetooth module also allows a user to control the setup parameters of the SPC.

Where reference has been made to infra-red remote controls and corresponding infra-red sensors, it will be understood that any form of remote control and corresponding sensors, including, without limitation, radio frequency remote controls, may be employed.

Although the invention has been herein shown and described in what is conceived to be the most practical and preferred embodiments, it is recognised that departures can be made within the scope of the invention, which is not to be limited to the details described herein but is to be accorded the full scope of the disclosure so as to embrace any and all equivalent devices and apparatus.

The invention claimed is:
1. A standby power controller including:
 a. a monitored and controlled outlet, wherein power supply through the monitored and controlled outlet is interrupted if an appliance powered therefrom is detected to be in a standby state;
 b. an infra-red sensor configured to detect the absence of use of an infra-red remote control associated with the appliance, wherein power supply through the monitored and controlled outlet to the appliance is interrupted if such absence of use indicates that the appliance is in an active standby state;
 c. a data communication means configured to establish a data communications link with a processing and display unit, wherein:
  (1) the data communications link communicates usage data characterizing the functioning of the standby power controller, the usage data including the indication of interruption of power supply through the monitored and controlled outlet owing to the appliance's being in a low power or the active standby state; and
  (2) the processing and display unit provides a user interface for the standby power controller, the user interface displaying information concerning the functioning of the standby power controller.

2. The standby power controller of claim 1 wherein the data communications means includes a short range wireless transceiver.

3. The standby power controller of claim 2 wherein the short range wireless transceiver includes one or more of:
 a. a Bluetooth transceiver, and
 b. a wi-fi transceiver.

4. The standby power controller of claim 1 wherein the processing and display unit is a mobile computing device.

5. The standby power controller of claim 4 wherein the mobile computing device is a smartphone.

6. The standby power controller of claim 1 wherein the usage data includes power usage data describing the amount of power drawn by an appliance through the standby power controller.

7. The standby power controller of claim 1 wherein the usage data includes status data describing the on/off status of power drawn through the standby power controller.

8. The standby power controller of claim 1 wherein the standby power controller is configured to have the power drawn by an appliance through the standby power controller switched by a command entered at the user interface.

9. The standby power controller of claim 1 wherein the standby power controller is configured to have at least some functionality controlled by commands entered at the user interface.

* * * * *